United States Patent [19]
Nishitani

[11] Patent Number: 5,627,409
[45] Date of Patent: May 6, 1997

[54] METER MODULE ASSEMBLY

[75] Inventor: Keizo Nishitani, Susono, Japan

[73] Assignee: Yazaki Corporation, Tokyo, Japan

[21] Appl. No.: 397,496

[22] Filed: Mar. 2, 1995

[30] Foreign Application Priority Data

Mar. 28, 1994 [JP] Japan .................................. 6-057072

[51] Int. Cl.$^6$ .................................................. H02B 1/04
[52] U.S. Cl. .......................... 307/10.1; 361/641; 361/647; 439/34
[58] Field of Search ................... 307/9.1, 10.1, 307/147; 340/458; 439/34, 620, 621; 361/664, 641–648, 600, 601, 622, 624, 626, 628–631, 668, 752, 775

[56] References Cited

U.S. PATENT DOCUMENTS

| | | | |
|---|---|---|---|
| 4,122,357 | 10/1978 | Sumida | 307/10.8 |
| 5,255,155 | 10/1993 | Sugimoto et al. | 361/752 |
| 5,353,190 | 10/1994 | Nakayama et al. | 307/10.1 |

FOREIGN PATENT DOCUMENTS

| | | |
|---|---|---|
| 57-38457 | 8/1982 | Japan . |
| 2-45238 | 2/1990 | Japan . |
| 4-266537 | 9/1992 | Japan . |

*Primary Examiner*—Richard T. Elms
*Attorney, Agent, or Firm*—Armstrong, Westerman Hattori, McLeland & Naughton

[57] ABSTRACT

A meter module assembly comprising: an instrument board implemented with meters/indicating lamps and a drive circuit therefor; an electric junction box integrating functional circuits to distribute and control power sources and input/output signals for the vehicle-mounted electric equipment including the meters/indicating lamps; a switch unit integrating switches for vehicle-mounted electric equipment; and wherein the combination meter panel, the electric junction box, and the switch unit are mounted and integrally united in a rear frame being attached to an instrument panel, connectors provided to the combination meter panel and the switch unit being coupled with connectors in the electric junction box.

7 Claims, 13 Drawing Sheets

METER MODULE ASSEMBLY

BACK GROUND OF THE INVENTION

1. Field of the Invention

This invention relates to a meter module assembly that facilitates electric wiring and mounting of electric instruments at the instrument panel portion of an automobile.

2. Description of the Prior Art

A great number of electric equipment are disposed around the instrument panel of a vehicle body. Therefore, the control units monitoring and controlling the electric equipment, meters, indicator lamps, switches, and the like are also gathered thereto. Consequently, the number of wires that constitute instrument panel wiring harnesses becomes enormous, making the harnesses enlarged and heavy and causing the wired state of the harnesses complicated, resulting in much labor and time required in installation. The maintenance is also made difficult.

For the purpose of easing such an undesirable situation, it is proposed in Japanese Patent Publication Specification No. Sho 57-38457 that to simplify the wired state of wiring harnesses and prevent their enlargement, a plurality of electric junction boxes which gather therein branch connections of wiring harnesses and carry a number of circuit-protecting fuses and control relays are dispersively arranged at suitable places in a vehicle.

Figure 12:
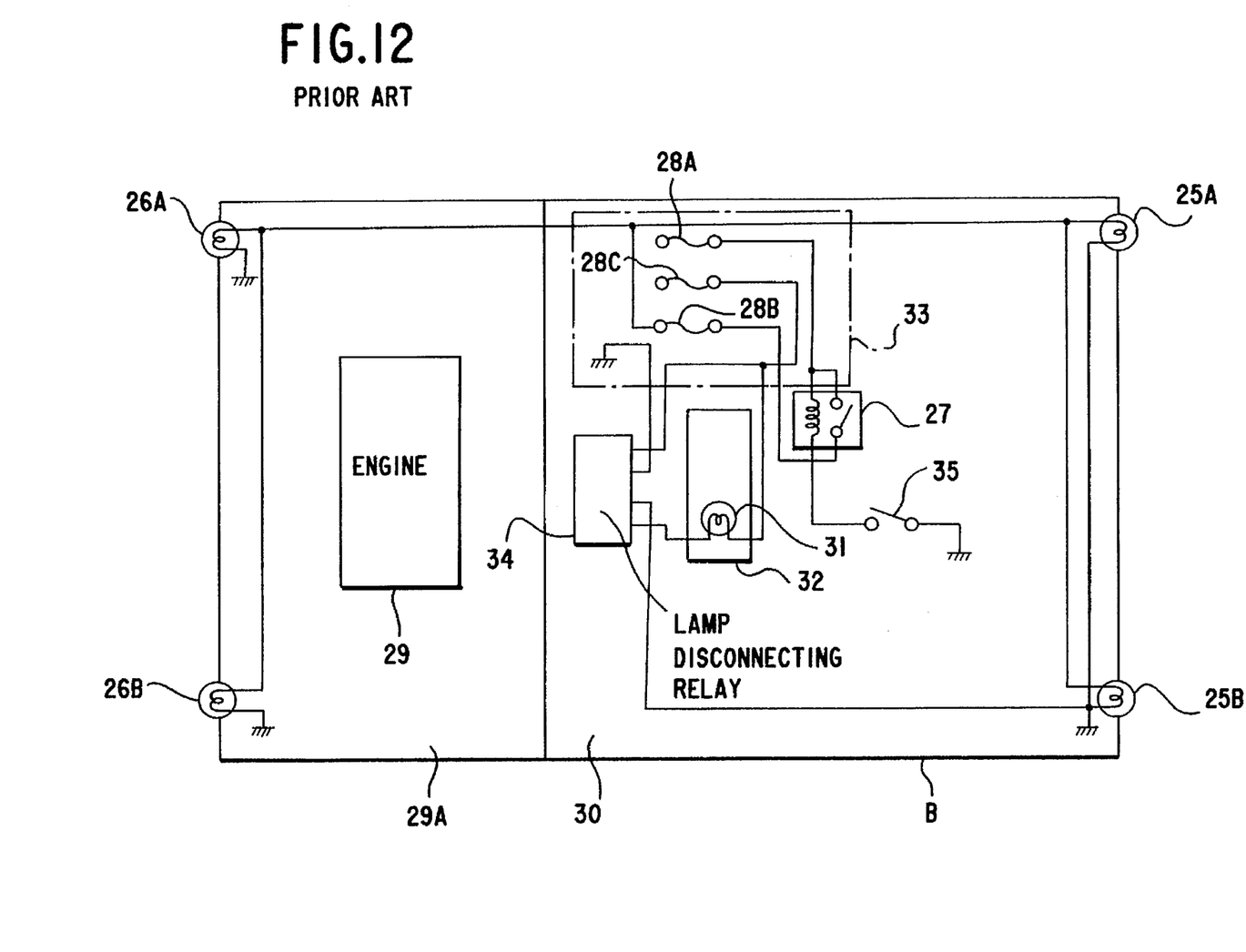
FIG. 12 is a known wiring diagram corresponding to the wiring diagram shown in FIG. 11.

FIG. 12 is a wiring diagram of a tail lamp system with such electric junction boxes used. Designated B a vehicle body; 25A, 25B tail lamps; 26A, 26B clearance lamps; and 29A an engine room with an engine 29 and a battery (not shown) therein. In the region 30 near an instrument panel, are arranged a supporting meter panel 32 for an alarm lamp 31 in respect of the tail lamp; a tail relay 27; an electric junction box 33 with a main fuse 28A, a tail fuse 28B, and a meter fuse 28C; a lamp disconnection relay 34; and a tail switch 35.

When the tail switch 35 is put on, the contacts of the tail relay 27 are closed and the current flows through the circuit with the tail fuse 28B to light the lamps 25A, 25B, 26A, and 26B. When either one of the lamps 25A or 25B is disconnected, the lamp disconnection detection relay 34 operates so that the alarm lamp 31 on the meter panel 32 may be lighted.

Figure 13:
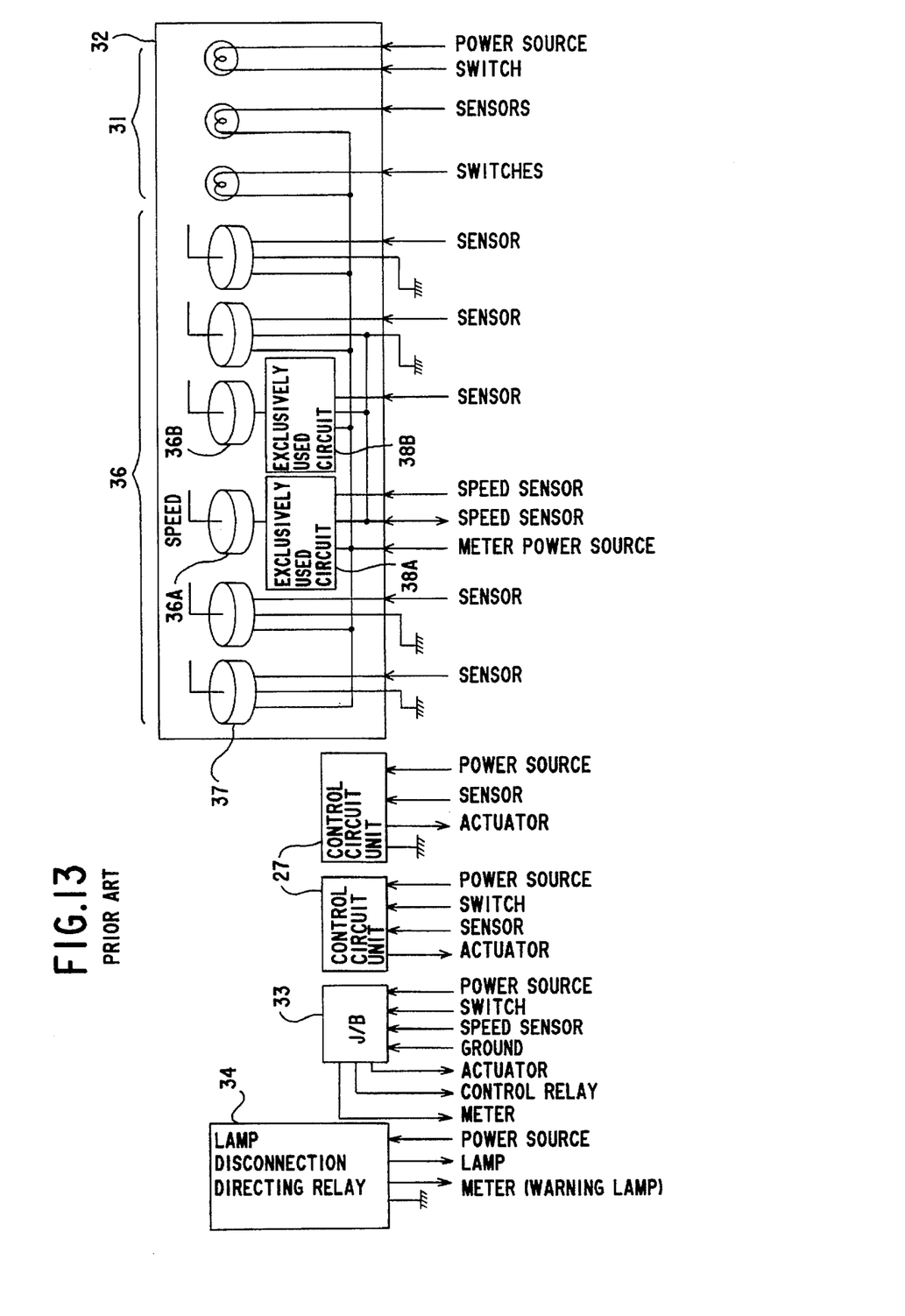
FIG. 13 is a block wiring diagram of known combination relays and a known electric junction box.

FIG. 13 is a block diagram of the wiring around the combination meter panel 32 combined with the such-like electric junction box 33, lamp disconnection detection relay 34, and control circuit units 27 such as a speed control relay and integration relay.

Inside the combination meter panel 32 are implemented a number of meters 36 such as an oil meter, battery meter, speed meter, and tachometer; their movements 37; and lamps 31 such as an indicator lamp, alarm lamp, and lighting lamp. The speed meter 36A and the tachometer 36B are respectively provided with control circuits 38A and 38B for their exclusive use. Further, the above-mentioned control circuit units 27 such as a speed control relay and integration relay are also dispersively arranged. Thus, the power lines and signal lines that connect these are very large in number, and the complicatedness is not solved by limitedly arranging a small number of junction boxes 33.

Under these conditions, it is proposed in Japanese Patent Application Preliminary Publication No. Hei 2-45238 that for the sake of reducing the number of circuits inside an electric junction box and the number of their connecting wires and simplifying the wiring harnesses around an instrument panel, the internal circuit of a meter panel includes a branch circuit having joints for connection with a wiring harness and the meter panel takes over a part of branch connections of the wiring harness.

Figure 14:
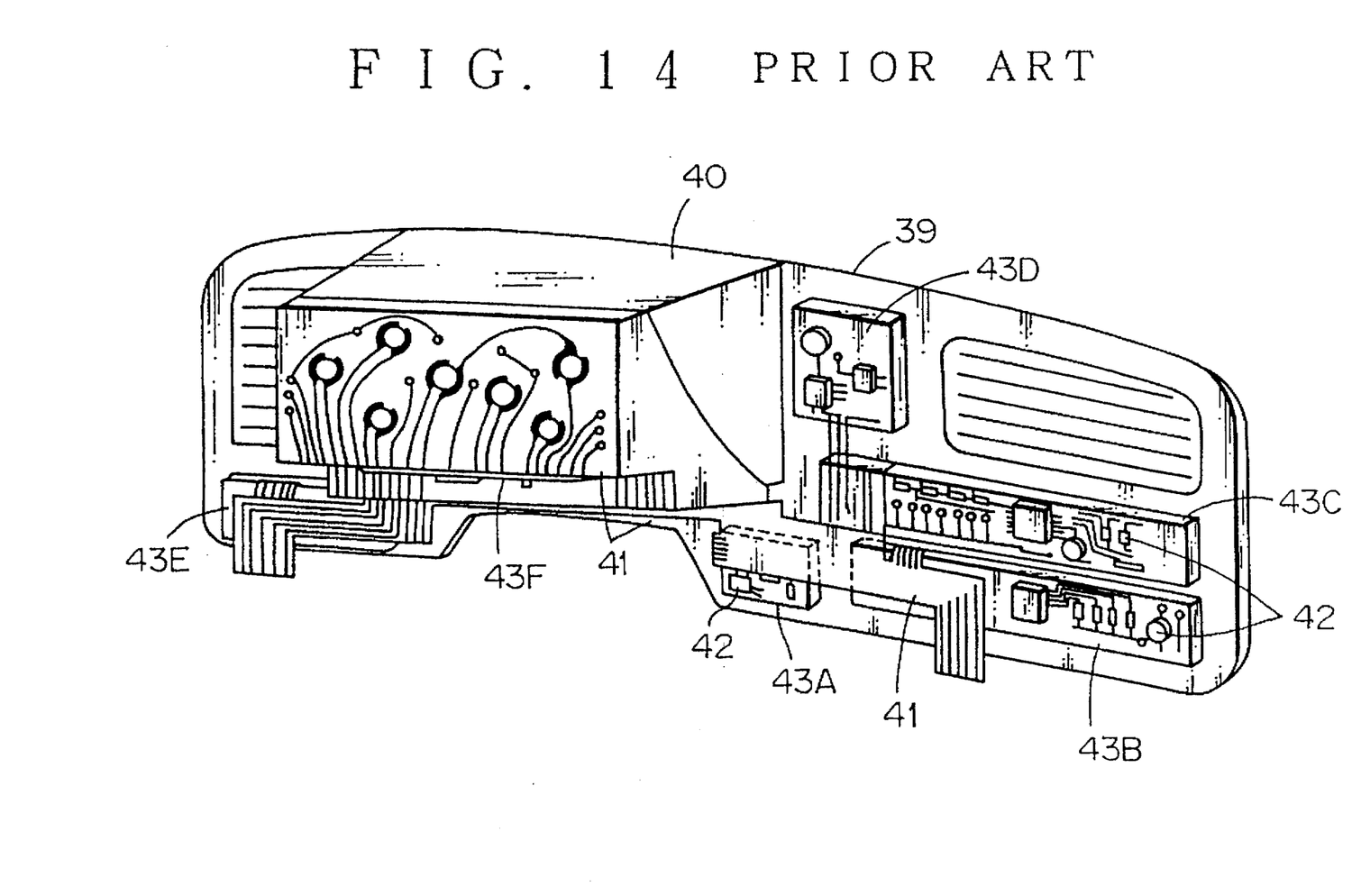
FIG. 14 is an explanatory diagram of a known instrument panel portion in its electric-circuit structure.

Further, in Japanese Patent Application Preliminary Publication No. Hei 4-266537, a circuit structure is proposed which comprises, as shown in FIG. 14; switches/instruments (not shown) implemented in a cluster 40 at an instrument panel 39 portion; a flexible printed circuit board 41 glued to the rear surface of the cluster for forming electric circuits for the switches/instruments; and circuit boards 43A to 43F with dispersively arranged electric function parts 42 for the memory, operation and the like needed for the electronic control of the switches/instruments, the circuit boards 43A to 43F being connected to the terminals of the printed circuit board 41.

It is to be noted, however, that if the internal circuits of the meter panel takes over a part of branch circuits of a wiring harness or of an electric junction box, insofar as control units for electric equipment are dispersively arranged, there is a limit to simplifying the wiring harnesses, which makes it difficult to cope with the accelerative electronization foreseen in view of the pursuit of safety and comfortableness in vehicles.

Further, although dispersively arranging the electric circuits (flexible printed circuit board) for the switches/instruments and the electronic control substrates directly on the cluster rear surface is advantageous in gathering their control circuit units on the rear surface, it involves the following disadvantages that it is technically difficult to adapt them to the irregularities on the rear surface. Further, for each type and grade of vehicles and each partial change in the specification, the design and production process must be changed, resulting in an increase in cost in case of multi-kind and small-quantity production. Moreover, an exclusive line for their assembling process is required to result in decreased productivity.

SUMMARY OF THE INVENTION

This invention has been accomplished to overcome the above drawback and its objects is to provide a meter module easily to cope with a change in type and grade of a vehicle and with an addition of electric equipment and remarkably simplifying the wires around the instrument panel to facilitate the wiring and installation.

In order to attain the object, according to an aspect of this invention, there is provided a meter module assembly which comprises: a combination meter panel implemented with meters/indicating lamps and a drive circuit therefor; an electric junction box integrating functional circuits to distribute and control power sources and input/output signals for the vehicle-mounted electric equipment including the meters/indicating lamps; a switch unit integrating switches for vehicle-mounted electric equipment; and wherein the combination meter panel, the electric junction box, and the switch unit are mounted and integrally united in a rear frame being attached to an instrument panel, connectors provided to the combination meter panel and the switch unit being coupled with connectors in the electric junction box.

On a front surface of the combination meter panel in the meter module assembly, a finish panel for mounting in the instrument panel is preferably provided.

Further, it is preferable that the rear frame is combined integrally with wire harnesses connected to the rear frame.

Referring to the operation of the above-mentioned invention, as the meter module assembly adopts the rear frame to be attached to the instrument panel, in this rear frame the electric junction box integrating functional circuits for the vehicle-mounted electric equipment including the meters/indicating lamps is mounted and the combination meter panel/the switch unit can be installed through an open side of the rear frame. Therefore, the attachment to the instrument panel is easily and rapidly carried out. In addition, the combination meter panel/switch unit are independently attached or detached with ease so that maintenance works may be simplified and the productivity may be extremely improved, resulting in a cost reduction. Further, it easily copes with differences in vehicle types/grades and additions of vehicle mounted electrical equipment, resulting in being suitable for a multi-kind and small quantity production.

Moreover, the combination meter panel implemented with the meters/indicating lamps and the drive circuits thereof, the electric junction box integrating the functional circuits to distribute the power sources and input/output signals fop the vehicle-mounted electric equipment including the meters/indicating lamps, and the switch unit integrating the switches for the vehicle-mounted electric equipment are gathered and integrally united in the rear frame so that the meter module assembly can be light in weight and small in size in conjunction with simplification of the wire harness arrangement.

DETAILED DESCRIPTION OF THE PREFERRED EMBODIMENTS

Figure 1:
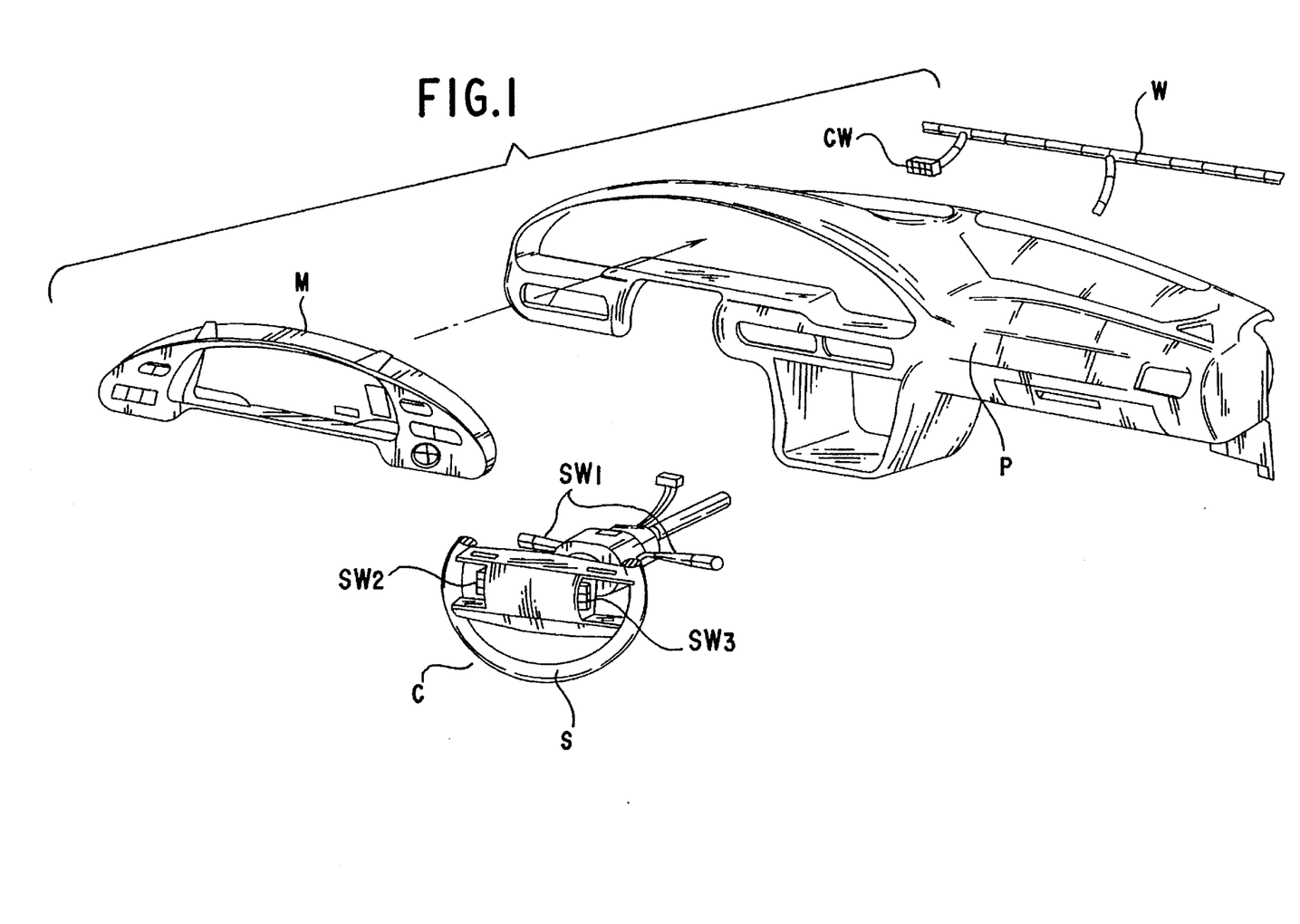
FIG. 1 is a perspective view showing a meter module assembly separated from an instrument panel according to an embodiment of this invention.
Figure 2:
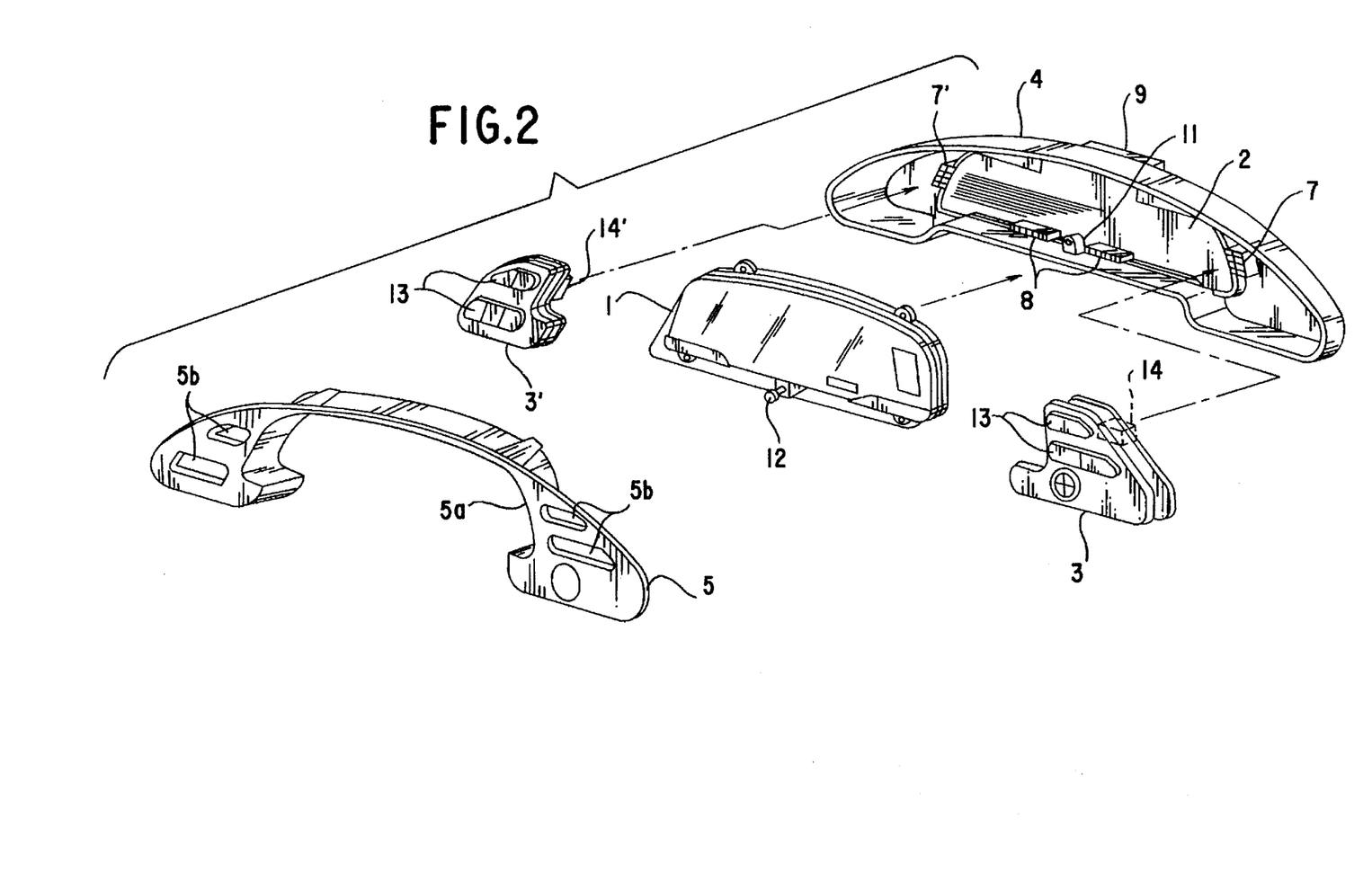
FIG. 2 is an exploded perspective view of the meter module assembly shown in FIG. 1.
Figure 3:
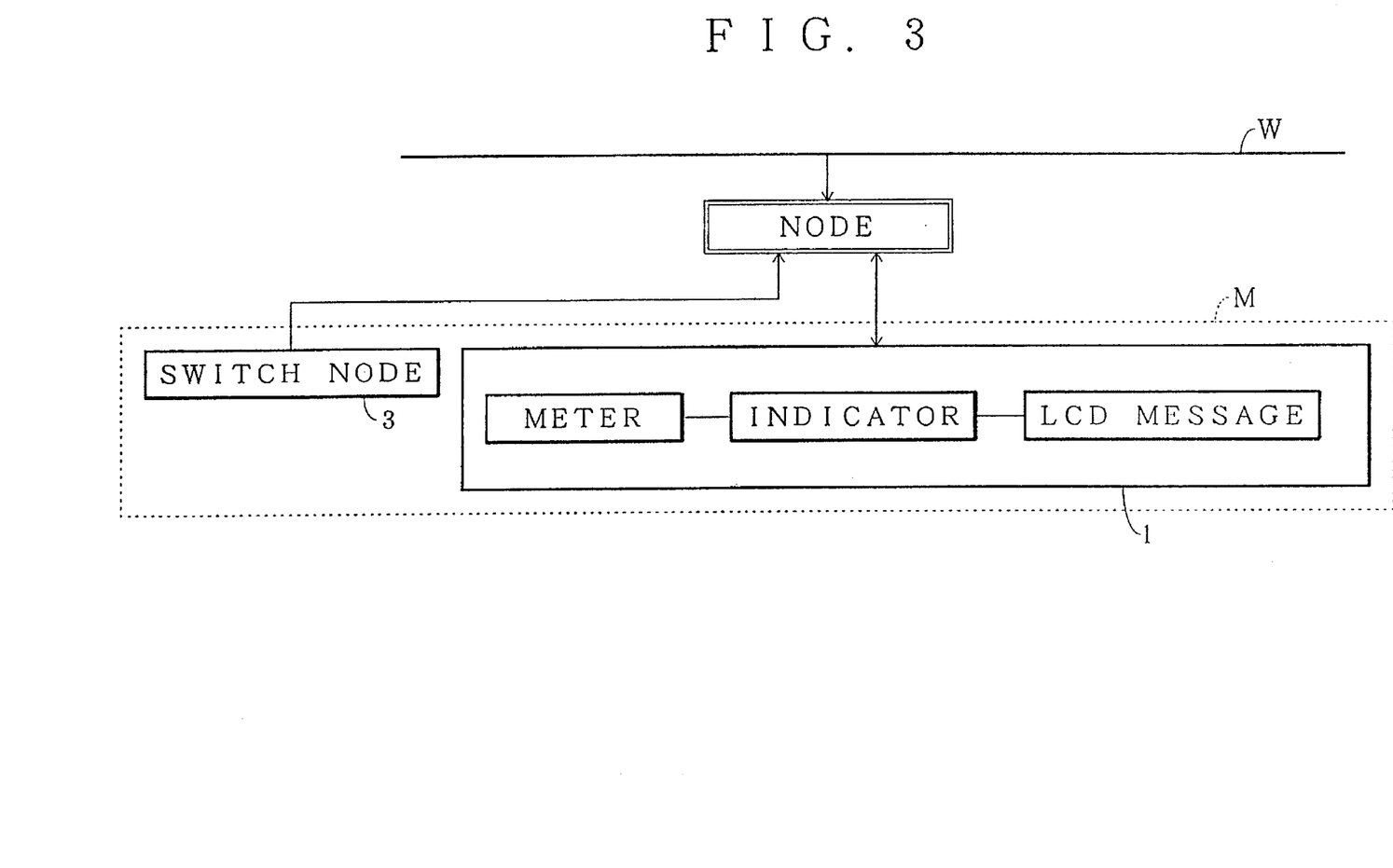
FIG. 3 is a system block diagram of the meter module assembly shown in FIG. 2.

FIG. 1 is a perspective view showing a meter module assembly M according to an embodiment of this invention, the meter module assembly being separated from an instrument panel P. FIG. 2 is an exploded perspective view showing the meter module assembly M, and FIG. 3 is a system block diagram of the meter module assembly M. Referring to these figures, the meter module assembly M and a steering wheel S with a column switch assembly C are mounted in the instrument panel P from the front side thereof, while an instrument panel harness W is also mounted in the panel from the rear side thereof. The column switch assembly C includes, e.g. switches such as a horn switch SW2 and tilt/tele switch SW3 in addition to multi-function switches SW1 installed on the left and right sides.

The meter module assembly M, as shown in FIG. 2, comprises: a combination meter panel 1 implemented with meters/indicating lamps and drive circuits thereof; an electric junction box 2 integrating functional circuits to distribute power sources and input/output signals for vehicle-mounted electric equipment including the meters/indicating lamps; a pair of switch units 3, 3' integrating switches for vehicle-mounted electric equipment; a rear frame 4 in which the electric junction box is attached; and a finish panel 5.

Figure 4:
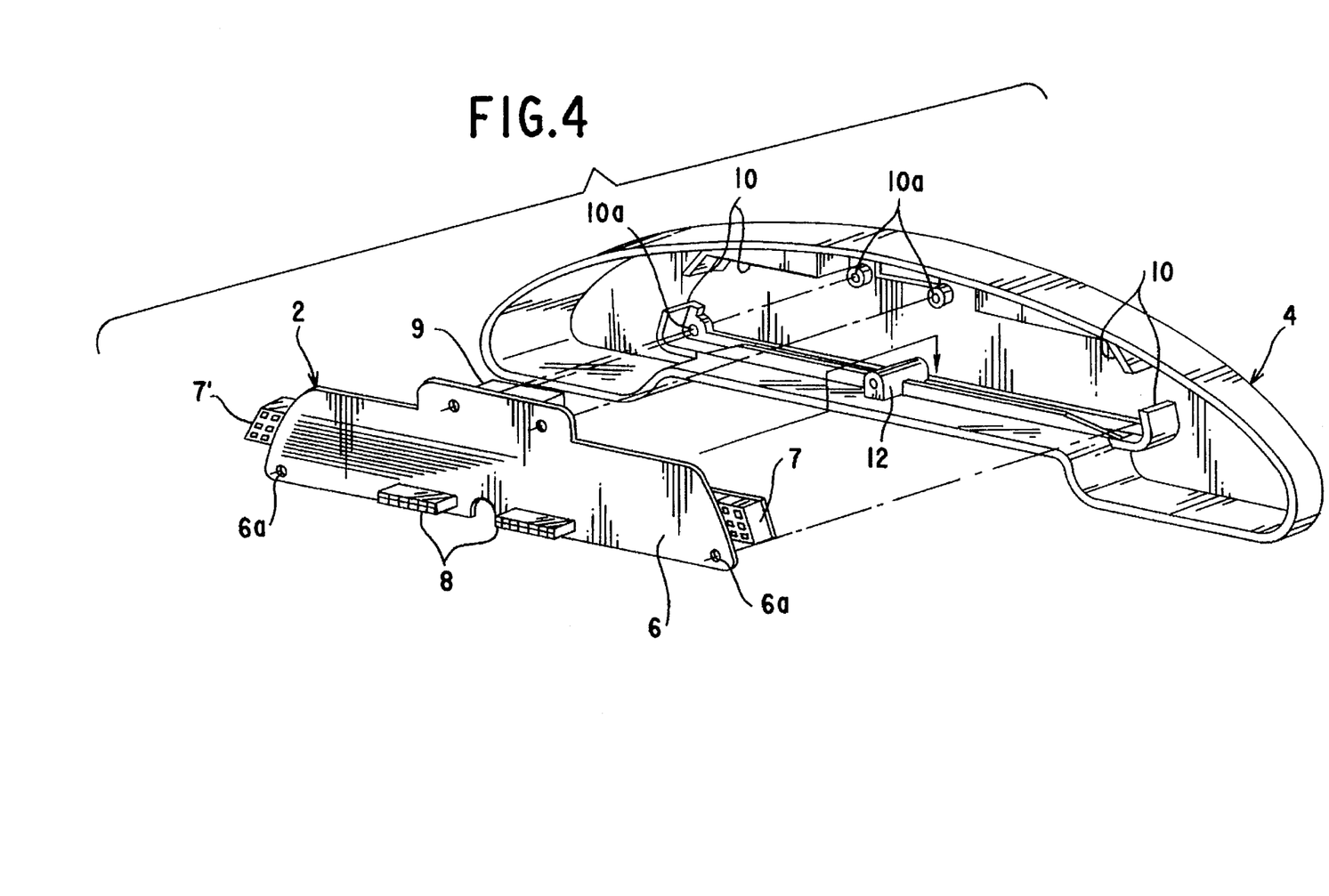
FIG. 4 is a perspective view showing the electric junction box and the rear frame shown in FIG. 2.

The rear frame 4 has a fitted-in frame work to install the meter module assembly in the instrument panel at a predetermined position thereof and, as shown in FIG. 4, is formed in a frame-shape by molding a synthetic resin material. In the rear frame 4, the combination meter panel 1, the electric junction box 2, and the switch unit 3, 3' are fixed by such a fastening member as setscrews, snap-fits, and clamps. Then, the meter module assembly M is furnished with the finish panel 5 as covering the front surface of the combination meter panel 1.

In the assembling of the meter module assembly M, firstly, the electric junction box 2 is received and fixed in the rear frame 4.

The electric junction box 2 comprises a circuit base board 6 with a functional circuit for controlling the meters and indicating lamps on the combination meter panel 1. On the right and left ends of the circuit base board 6, connectors 7, 7' connected to the switch units 3, 3' are attached as engaging portions thereof being faced forward. On the middle portion of the circuit base board 6, a connecter 8 connected to the combination meter panel 1 is attached respectively as their mating portion facing forward. On the rear portion of the board 6, a connector 9 engaging with connecters CW in the instrument panel harness W is provided On the periphery of the circuit base board 6, a plurality of fixing holes 6a are formed. A fixing frame formed integrally on the rear frame 4 is fixed by setscrews penetrating through both of fixing holes 10a in the board and the holes 6a so that the circuit base board 6 in the electric junction box 2 can be fastened in the rear frame 4. Further, in an inside lower portion of the rear frame 4, a bolt receiving projected portion 11 is provided so as to engage with a detachable bolt 12 positioned on the lower portion of the combination meter panel 1 to fix the combination meter panel 1.

Firstly, the electric junction box 2 is fixed in the rear frame 4. Secondly, the switch units 3, 3' and the combination meter panel 1 are mounted in the rear frame 4. The switch unit 3, 3' provided on the front faces thereof with various kind of operational switches 13 are fastened in the rear frame by setscrews(not shown). At that time, connectors 14, 14' mounted on the switch units 3, 3' are coupled respectively with connecters 7, 7' in the electric junction box 2 to make electric connection.

Figure 5:
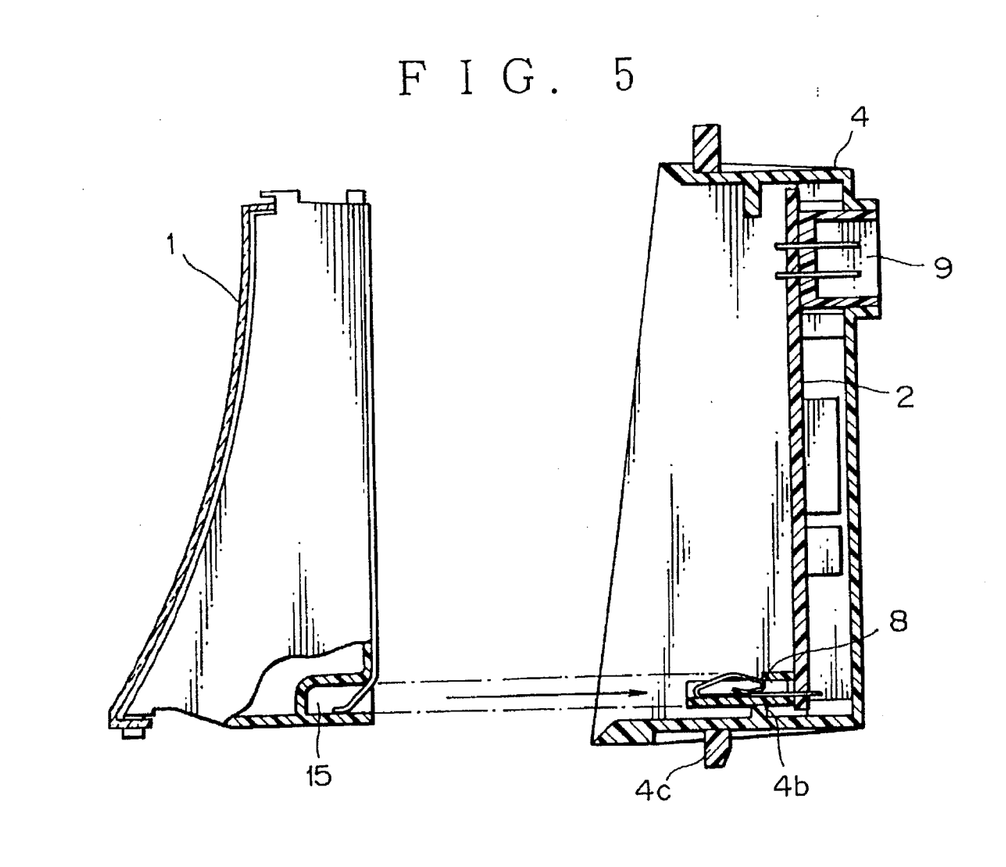
FIG. 5 is a longitudinal sectional view showing the state of mounting a combination meter panel to the rear frame with the electric junction box installed therein.
Figure 6:
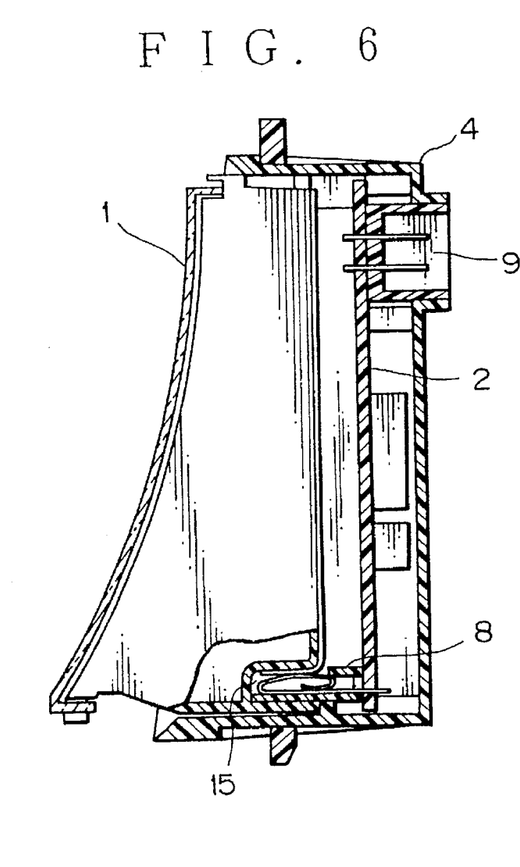
FIG. 6 is a longitudinal sectional view showing the state of having received the combination meter panel in the rear frame shown in FIG. 5.

The combination meter panel 1, as shown by the arrow in FIG. 5, makes electric connection by the connector 15 provided therein which is coupled with a connector 8 in the electric junction box 2. At that time, the combination meter panel 1 and rear frame 4 are fastened by setscrews as shown in FIG. 6. Designated 4b is a positioning stopper for the insertion of the connector 15 and designated 4c is a hook portion used for fixing the rear frame 4 to the instrument panel P.

The combination meter panel 1, the electric junction box 2, and the switch units 3, 3' are installed to be integrally united in the rear frame 4. Thence, on the front surface of the rear frame 4, the finish panel 5 is fixed by setscrews to form the meter module assembly M.

The decorative finish panel 5 has an indicating screen 5a for the combination meter panel at the middle portion thereof and each indication screen 5b for the switch unit at each side end thereof.

The meter module assembly M is mounted to the instrument panel P in the way of the following process.

Figure 8:
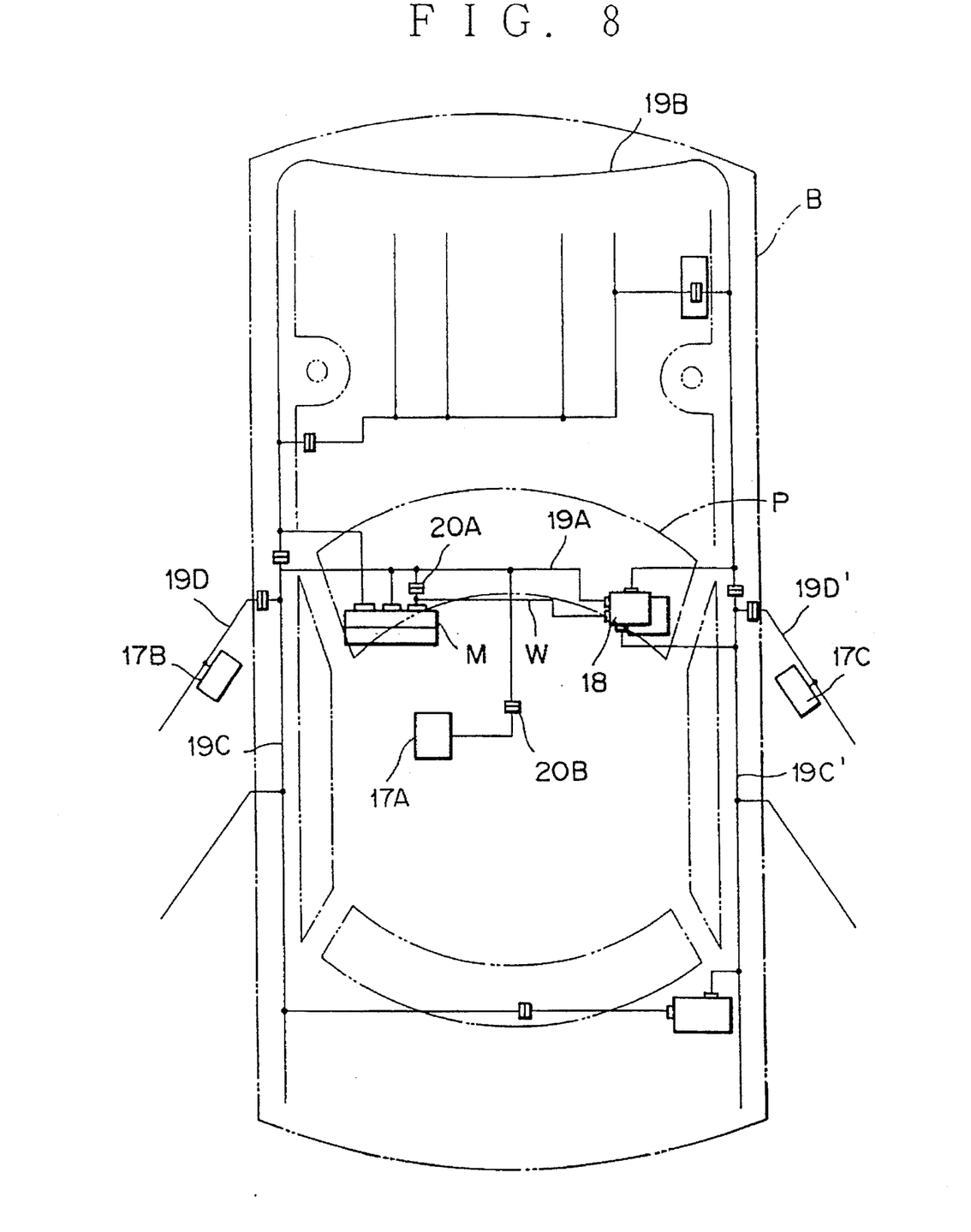
FIG. 8 is an explanatory diagram showing an example of a wire harness arrangement in a vehicle utilizing the meter module assembly shown in FIG. 2.

From the front of the instrument panel P, the meter module assembly M is inserted to be fixed in the panel. Then, the connector 9 attached on the reap face of the electric junction box 2 is mated with the connector CW of the instrument panel harness W, and such a wire harness as a cowl side wire harness 19A/a engine room main wire harness 19B, as shown in FIG. 8, may be also connected similarly.

In respect of the meter module assembly M, when the finish panel 5 being removed, the combination meter panel 1, the electric junction box 2, and the switch units 3, 3' are independently attached or detached with ease so that the maintenance works can be extremely simplified.

Figure 7:
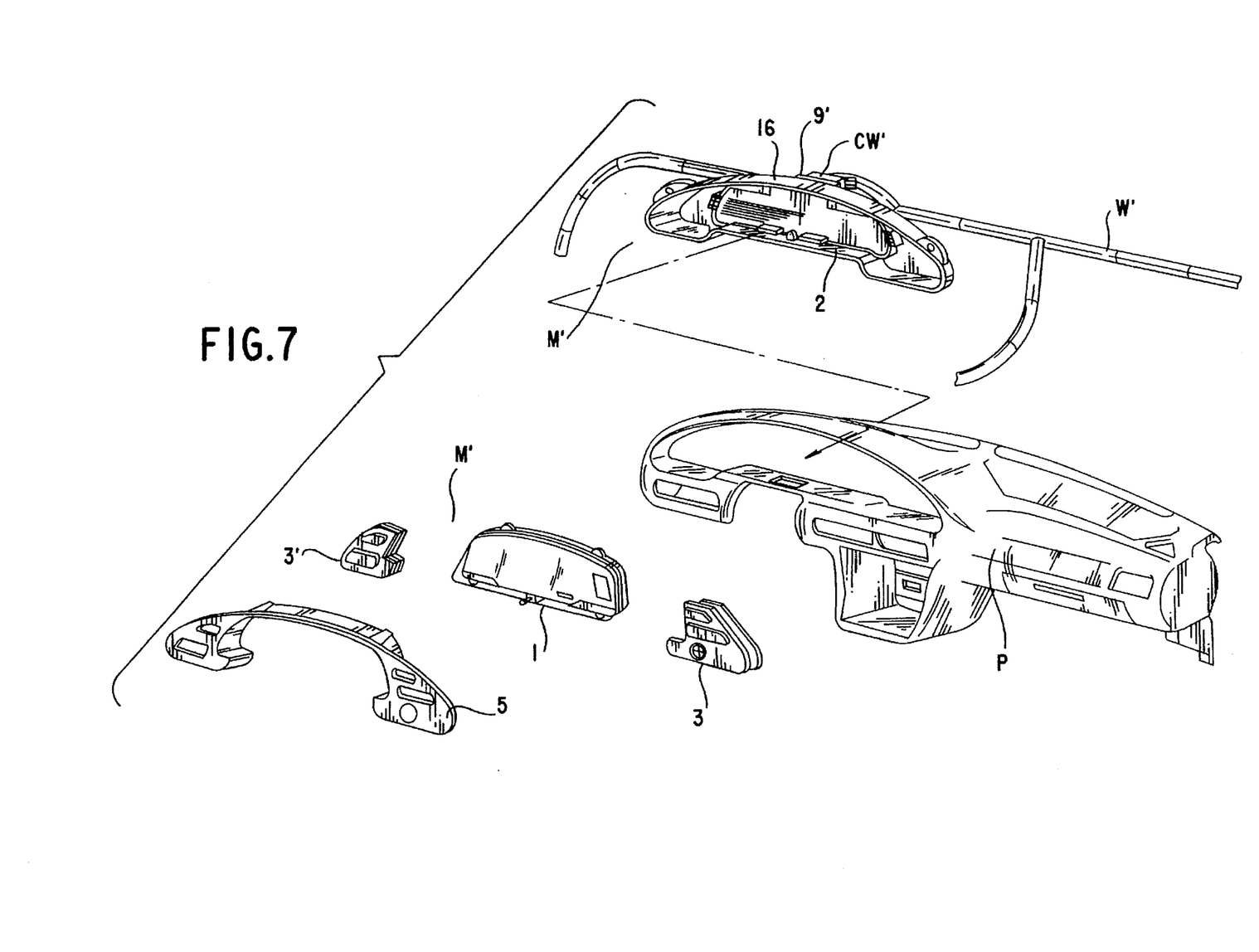
FIG. 7 is an exploded perspective view showing another embodiment according to this invention.

FIG. 7 is a perspective view showing a meter module assembly M' according to another embodiment of this invention.

The meter module assembly M' receives a combination meter panel 1, a electric junction box 2, switch units 3, 3' and so on, which are similar to the case of the aforementioned meter module assembly M, in the rear frame 16 to unit integrally them.

The rear frame 16 is similar to the above-mentioned rear frame 4 in the structure of its front surface, however, the rear frame 16 combines a part of an instrument panel harness W' on the rear surface thereof to unit it integrally. A connector CW' of the instrument panel harness W' and a connector 9' located on the rear surface of the electric junction box 2 are connected to each other to make electric connection. In this state, the rear frame is mounted to the instrument panel P, thence the combination meter panel 1, the switch units 3, 3', the finish panel 5 and so on are mounted in the rear frame 16.

The meter module assembly M', in addition to the advantage of the meter module assembly M, has the following advantage. That is, as the rear frame 16 and the instrument panel harness W' are united integrally, the connector 9' of the rear frame 16 and the connector CW' of the instrument panel harness W' can be connected in advance. Consequently, it becomes unnecessary that an instrument wire harness and a meter module assembly must be combined at the narrow working space around the instrument panel portion in a vehicle. As a result, even in case of a complicated circuits configuration requiring multi-polar connectors, the meter module assembly can be mounted therein with ease.

FIG. 8 is an explanatory diagram showing an example of a wire harness arrangement in a vehicle utilizing a meter module assembly M according to an embodiment of this invention. In the drawing, designated 17A to 17C are a circuit control unit or an electric junction box and designated 18 is a main electrical junction box in a known structure mounted by many fuses, relays and so on.

In the left side of the instrument panel P, the meter module assembly M is installed; in the right side thereof, the main electric junction box 18 is located; and in the intermediate portion thereof, there is arranged a sheet module 17A for controlling various kinds of optional electric equipment. Further, on right and left doors, a door module 17B for a driver and a door module 17C for the other front sheet are arranged.

Designated 19A is a cowl-side wire harness; 19B an engine room wire harness; 19C and 19C' floor wire harnesses; 19D and 19D' door wire harnesses; and, 20A and 20B female and male connectors respectively.

Figure 9:
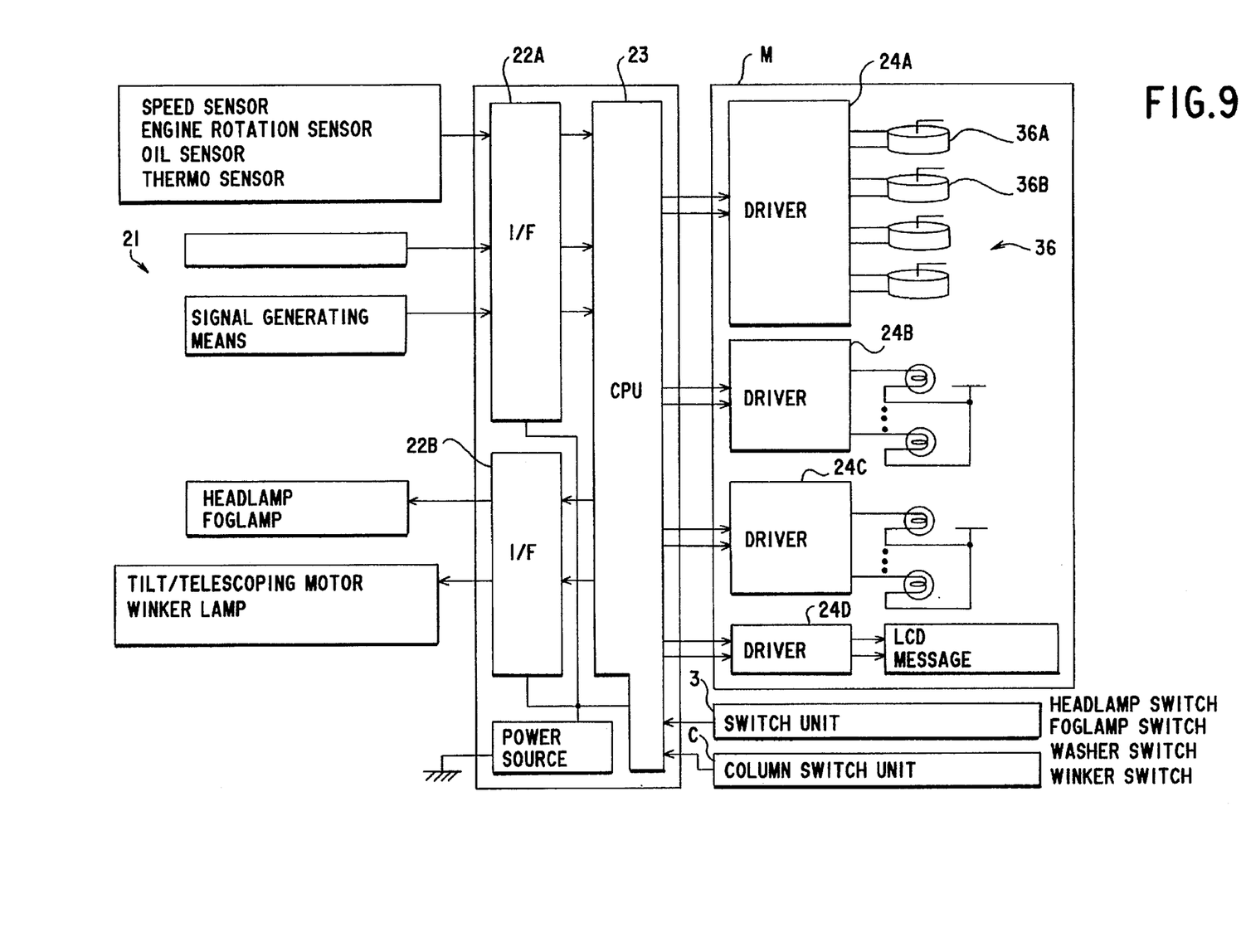
FIG. 9 is a block wiring diagram of the meter module assembly shown in FIG. 2.
Figure 10:
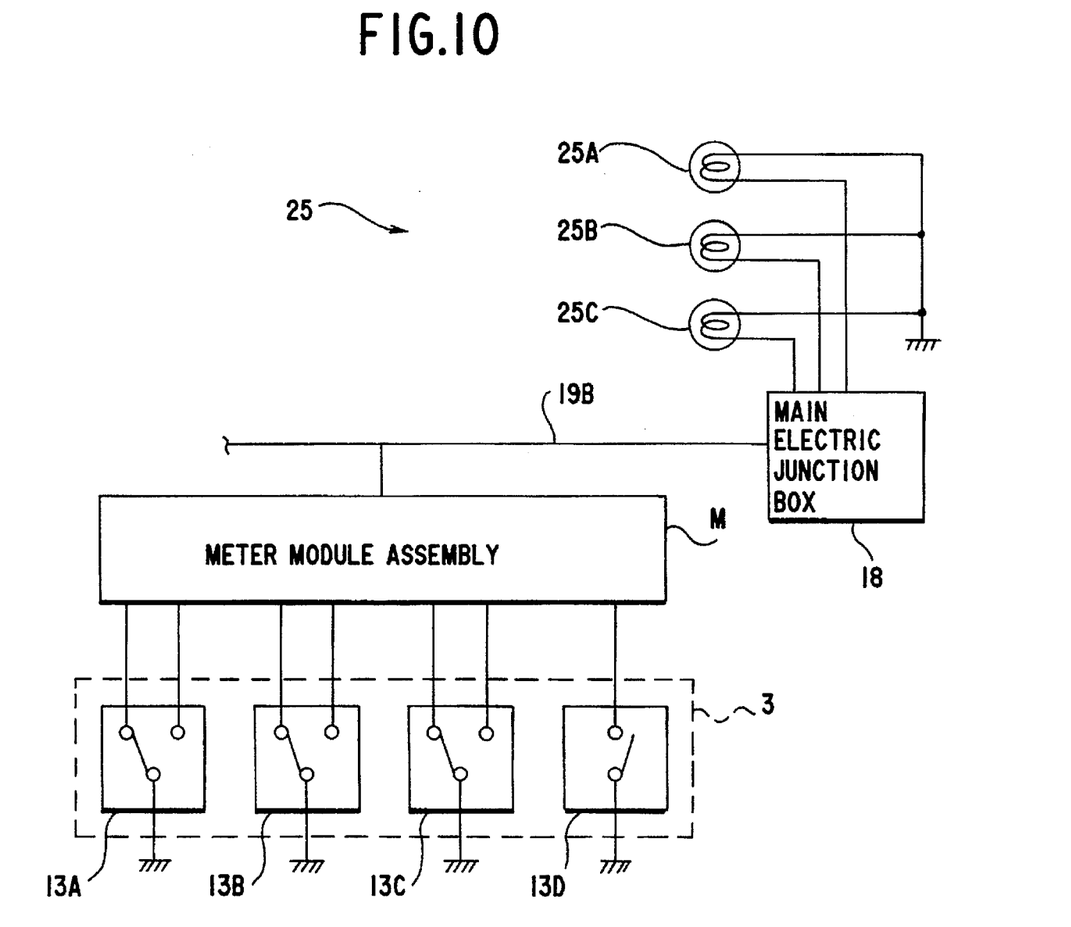
FIG. 10 is a wiring diagram of a switch circuit portion of FIG. 9.

FIG. 9 is a block wiring diagram of the meter module assembly M and FIG. 10 shows wirings of its switch circuits.

In FIG. 9, designated 21 is some kinds of signal generating means; 22A an input I/F circuit; 22B an output I/F circuit; 23 CPU (central processing unit); and, 24A to 24D some kinds of driver circuits.

The electric junction box 2 units functional circuits (transducers for multiplex-transmission signals ) integrally mounted therein and some kinds of switches 13A to 13D are united to compose the switch units 3, 3'. As they are directly connected to the CPU 23, no sub harnesses for their connection are needed. While, in FIG. 10, designated 25A to 25C are such lamps 25 as a head lamp and a fog lamp.

Figure 11:
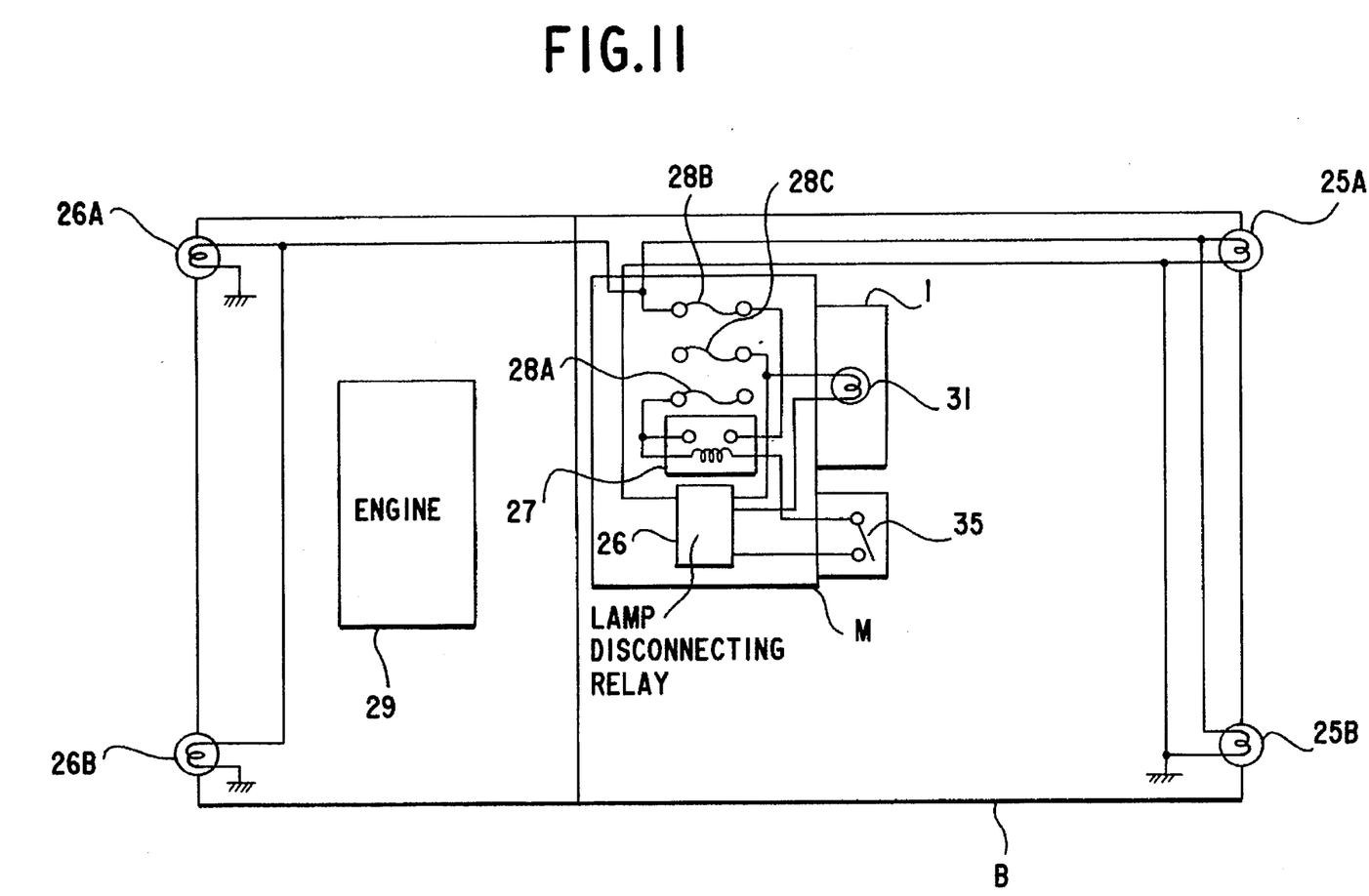
FIG. 11 is a wiring diagram showing an example of a wiring arrangement in a vehicle utilizing the meter module assembly shown in FIG. 2.

FIG. 11 is a wiring diagram showing a tail lamp system adopted in the meter module assembly M according to this invention. In this case, compared with a prior art shown in FIG. 12, a tail lamp disconnection detecting relay 26, a tail relay 27, and fuses 28A to 28C have been gathered and mounted in the meter module assembly M so that the number of wiring wires can be apparently decreased.

Referring to the operational effect of the above-mentioned invention, the meter module assembly may adopt the rear frame being attached to the instrument panel. In this rear frame, the electric junction box integrating functional circuits for the vehicle-mounted electric equipment including the meters/indicating lamps is mounted and the combination meter panel/the switch units can be installed through an open side of the rear frame. Therefore, the installation to the instrument panel is easily and rapidly carried out and the combination meter panel/the switch units are independently attached or detached with ease so that the maintenance works may be simplified and the productivity may be extremely improved, resulting in a cost reduction. Further, it easily copes with differences in vehicle types/grades and additions of vehicle mounted electrical equipment, resulting in being suitable for a multi-kind and small quantity production.

Moreover, the electric junction box integrating functional circuits to distribute and control power sources and input/output signals for vehicle-mounted electric equipment including the meters/indicating lamps and the switch unit integrating switches for the vehicle-mounted electric equipment are gathered and integrally united in the rear frame so that the meter module assembly can provide a great deal of advantages such as being light in weight and small in size in conjunction with simplification of the wire harness wiring.

What is claimed is:

1. A meter module assembly comprising:

a combination meter panel implemented with meters, indicating lamps and a drive circuit therefor and including connectors;

an electric junction box means for integrating functional circuits to distribute and control power sources and input and output signals for vehicle-mounted electric equipment including said meters and said indicating lamps, wherein said electric junction box means includes a circuit base board having holes therein and connectors attached thereto;

at least one switch means for integrating switches of said vehicle-mounted electric equipment, wherein each said switch means includes operational switches and connectors;

a finish panel provided in front of said combination meter panel, wherein said finish panel includes indication screens for said operational switches; and wherein said combination meter panel, said electric junction box means, and said switch means are mounted and integrally united in a rear frame attached to an instrument panel, said switch means having an external form guided along an inner surface of said rear frame to position in said rear frame, said connectors provided to said combination meter panel and said switch means coupled with said connectors in said electric junction box means, said rear frame having an external form fitted into an open recess provided in said instrument panel.

2. The meter module assembly according to claim 1, wherein said rear frame is formed with a wire harness connected to said rear frame.

3. The meter module assembly according to claim 1, wherein, on said circuit base board of said electrical junction box means, said connectors connected to said switch means and said combination meter panel are attached as engaging portions thereof faced forward, and, on a rear portion of said circuit base board, a connector engaged with a connector in the instrument panel harness is provided.

4. The meter module assembly according to claim 1, wherein, when said finish panel is removed, said combination meter panel, said electric junction box means, and said switch means can each be independently attached or detached to said rear frame and can be positioned to be fixed in said rear frame by set screws.

5. The meter module assembly according to claim 1, wherein said electric junction box means and said switch means are directly connected to a central processing unit.

6. The meter module assembly according to claim 1, wherein a tail lamp disconnection detecting relay and a tail relay are mounted in said meter module assembly.

7. The meter module assembly according to claim 1, wherein said instrument panel has a main electric junction box mounted with a plurality of fuses and relays.

* * * * *